Feb. 20, 1940. W. R. KEEHN ET AL 2,191,170
AUTOMATIC GAFF HOOK
Filed April 26, 1938 2 Sheets-Sheet 2
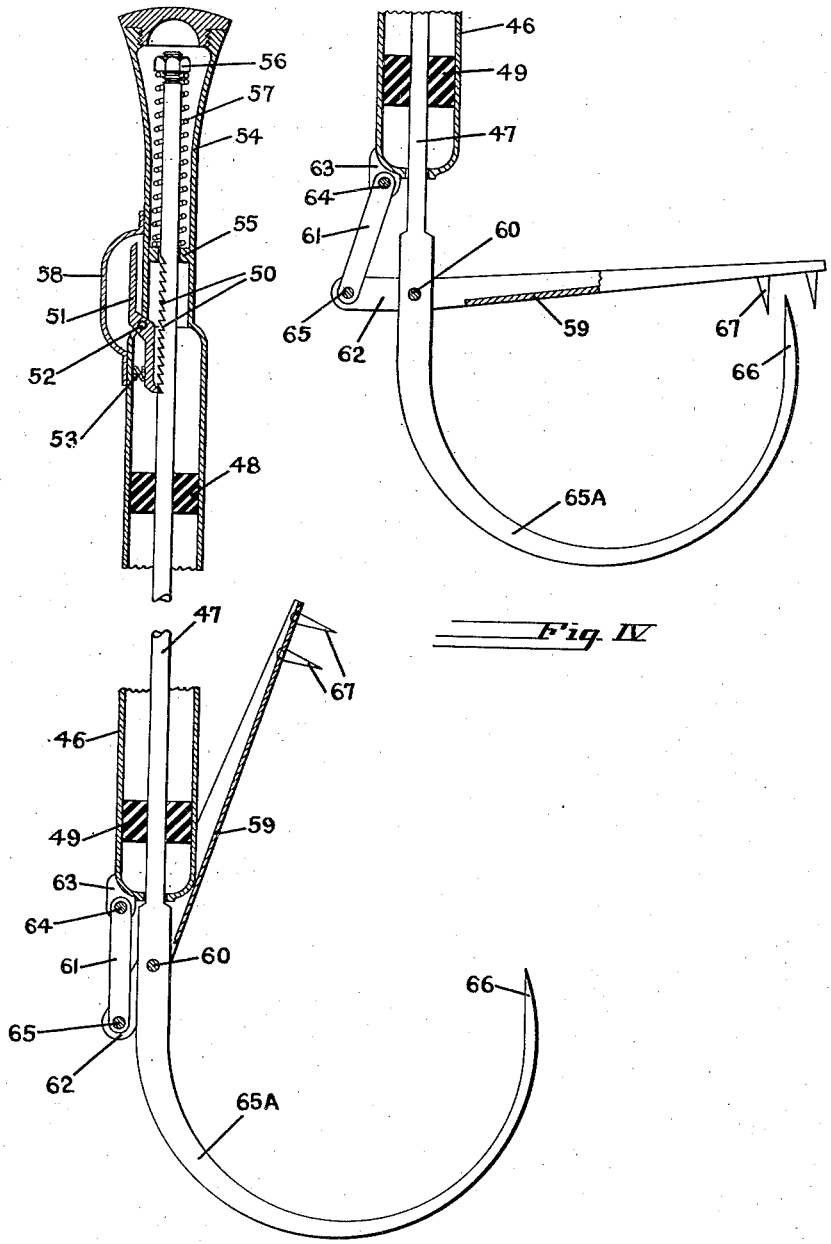
INVENTORS
William R. Keehn
John A. Doerfer
BY
ATTORNEY Patented Feb. 20, 1940

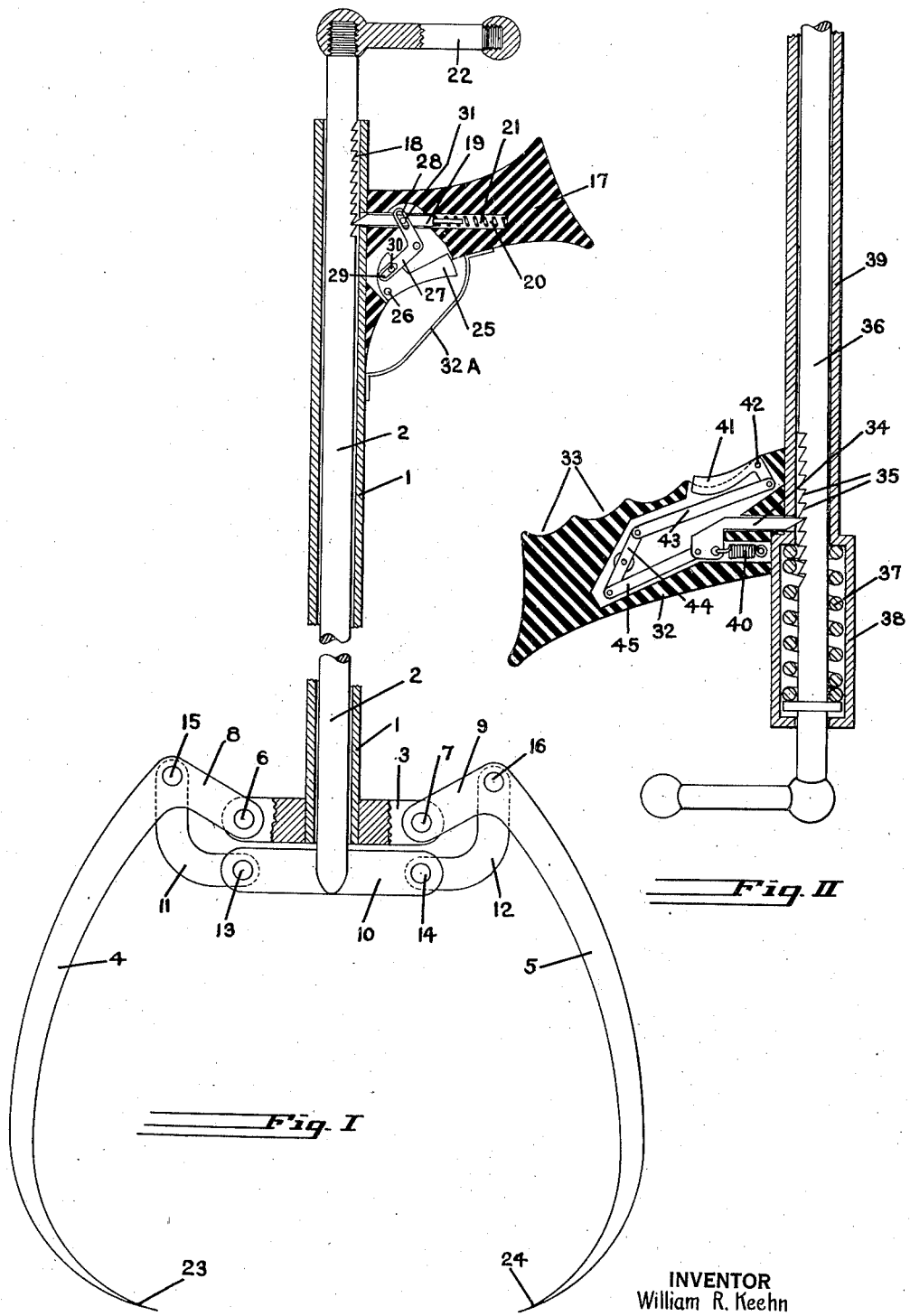

2,191,170

UNITED STATES PATENT OFFICE 2,191,170

AUTOMATIC GAFF HOOK

William R. Keehn, Marysville, and John A. Doerfer, Bellingham, Wash.

Application April 26, 1938, Serial No. 204,344

3 Claims. (Cl. 43—5)

Our invention relates to fish recovering devices and particularly to gaff hooks.

The primary purpose and object of our invention is to provide a gaff hook that is sure in its operation, that is light in weight, and one that insures the landing of the catch when the gaff hook is skillfully applied.

A further object of our invention provides a gaff hook that will be extremely light in weight and one that may be actuated by one hand of the fisherman.

A still further object of our invention is to provide a gaff hook that locks itself into the fish once the fish has been engaged by the gaff.

Our invention is comprised primarily of a tube having a shaft running longitudinally and coaxially with the tube and having a handle associated with the tube. A pair of gaff hooks or a gaff hook and a locking bar are associated with the base end of the assembly and the shaft supports and actuates the hook or hooks and the shaft carries locking notches that lock the hook or hooks in position and placement when the fish is engaged to thereby provide simple means for maintaining the fish upon the hook or hooks. A trigger is associated with the handle that is adapted for releasing the shaft to permit and facilitate the removal of the fish from the hook or hooks.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

Fig. I is a fragmentary sectional side view of the double jaw gaff hook.

Fig. II is a fragmentary sectional side view of the handle and of the grip lever.

Fig. III is a fragmentary sectional side view of the single jaw gaff hook. In this view the lock bar is shown open.

Fig. IV is a fragmentary sectional side view of the lower end of the assembly. In this view the lock bar is shown closed.

Like reference characters refer to like parts throughout the several views.

Fig. I and Fig. II show a form of device that is adapted for use where larger fish are to be gaffed. In these views we form a central tube 1 that comprises the main central support for the assembly.

A manipulative shaft 2 extends longitudinally of the tube 1. A head 3 is disposed upon the lower end of the tube 1 and gaffing jaws 4 and 5 are hingedly secured to the head 3. This is accomplished by hinged pins 6 and 7 that are fixed relative to the head 3 and about which the base ends 8 and 9 are attached.

The gaff hooks 4 and 5 are made in the form of bell cranks and a manipulative head 10 is disposed upon the lower end of the shaft 2.

The outer end of the head 10 is bifurcated and manipulative links 11 and 12 are hingedly disposed within the bifurcated ends of the head 10 and the same rock about journaled pins 13 and 14. The links 11 and 12 are connected to the jaws 4 and 5 by hinged pins 15 and 16, and a handle grip 17 is secured to the upper end of the tube 1 and locking notches 18 are disposed upon the outer surface of the shaft 2 and adjacent the end.

A locking pawl 19 is disposed within the handle 7 and the pawl 19 is urged toward the shaft 2 and into engaging contact with the notches 18 by a reactance means as a coil spring 20 that is disposed within the barrel 21 that is disposed within the handle.

An arm 22 is removably secured to the upper end of the shaft 2. The purpose of the arm is to manipulate the shaft 1 and to force the points 23 and 24 into contact with the fish to be gaffed. As the points 23 and 24 engage the fish, they are held in locked position by the pawl 19 engaging the locking notches 18.

When it is desired to remove the gaff hooks from the fish gaffed, the finger of the hand engaging the handle 17 is made to engage the release trigger 25. The trigger 25 is recessed within the handle 17 and is hinged about a hinged pin 26.

A bell crank 27 connects the trigger with the pawl 19. Each end of the bell crank 27 has slots 28 and 29 disposed therein and the same coact with pins 30 and 31 that are connected respectively to the trigger 25 and the pawl 19.

A guard 32A is disposed about the outer surface of the trigger 25. A modified form of handle and locking arrangement is illustrated in Fig. II. A handle 32 is provided and finger grooves 33 are disposed within the fingering engaging side of the handle 32. A pawl 34 is disposed within the handle and the same coacts with and engages the notches 35 disposed within the shaft 36. The points of the gaff hook are held spaced apart by a coil spring 37 that is disposed within the head 38 of the tube 39 and a spring 40 normally urges the pawl 34 into contact and into locking engagement with the notches 35.

When it is desired to unlock the pawl from engagement with the locking notches, the finger of the operator is made to engage the trigger 41. The trigger 41 is made in the form of a bell crank and it is hingedly secured about a hinged pin 42.

A link 43 communicates the trigger with a pivot bar 44 and a link 45 communicates the pivot bar 44 with the locking pawl 34. Otherwise the purpose and object of the trigger release assembly is the same as heretofore described as disclosed in Fig. I.

Where smaller fish are to be caught we provide a construction as illustrated in Figs. III and IV, and this construction is comprised of a tube 46. Tube 46 has a shaft 47 running longitudinally thereof and the shaft 47 is held in alignment and in spaced arrangement by suitable bearing blocks 48 and 49. The blocks 48 and 49 are preferably made of a suitable rubber.

The shaft 47 has a plurality of locking notches 50 disposed upon one of its edges, and a pawl 51 is provided. The pawl 51 is pivoted about a hinged pin 52 and a reactance means as a coil spring 53 maintains the pawl in normal engagement within one of the locking notches.

A handle 54 is disposed upon the upper end of the tube 46 and a shoulder 55 is disposed within the handle.

The shaft 47 passes beyond the shoulder 55 and a nut 56 is threadably secured to the handle end of the shaft. A coil spring 57 is disposed about the shaft and one end of the spring rests upon the shoulder 55. The oppositely disposed end of the spring rests beneath the nut 56. A trigger guard 58 is disposed about the trigger 51 and protects the trigger. A locking bar 59 is provided. The locking bar 59 is hinged relative to the shaft 47 by hinged pin 60. The hinged pin 60 passes through the locking bar 49 and the shaft 47.

A link 61 is connected to the short end 62 of the locking bar 59. A lug 63 is disposed upon the base end of the tube 46. Connection is effected through the use of pins 64 and 65. The base end of the shaft 47 terminates in a hook 65A and the same is pointed as illustrated at 66 and the locking bar 59 has a plurality of spaced pins 67 disposed upon its end and the same are adapted for substantially meeting and straddling the pointed end 66 of the hook and to be disposed on either side thereof when the same is lowered.

When the fish is gaffed and pressure is exerted, the shaft 47 moves longitudinally of the tube and simultaneously the locking bar is actuated to cause the points 67 to move toward the point 66. Simultaneously the spring 57 is compressed and the bar 47 moves along the locking notches to thereby lock the locking bar in fixed relation with the pointed end of the gaff hook 65, and the greater the pressure that is applied in tension upon the bar 47 the tighter the locking bar will engage the fish gaff.

When it is desired to release the fish from the gaff hook the trigger 51 is compressed and the locking bar 59 will be automatically raised through the action of the coil spring 57.

While the form of mechanism herein shown and described is admirably adapted to fulfill the objects primarily stated, it is to be understood that it is not intended to confine the invention to the one embodiment herein shown and described, as it is susceptible of embodiment in various forms, all coming within the scope of the claims which follow.

What we claim is:

1. In a device of the class described, the combination of a tube, a shaft disposed longitudinally of the tube and disposed coaxially with the tube, a gaff hook formed integral with the shaft as disposed at the outer end of the shaft and tube, bearing blocks disposed within the tube and adapted for acting as bearing for the shaft and for maintaining the shaft coaxial with the tube, a locking jaw disposed at the base end of the tube, said locking jaw being adapted for actuation by the shaft disposed longitudinally of the tube, means for normally maintaining the locking jaw and the gaff hook spaced apart, a handle disposed adjacent the top end of the tube, a locking pawl associated with the handle and adapted for coacting with the shaft and for maintaining the shaft in fixed placement relative to its movement in one direction, a trigger associated with the locking pawl and adapted for releasing the locking pawl from locking engagement with the shaft when the locking pawl is manually manipulated, and a spring disposed in the handle for manually maintaining the shaft disposed in the tube in a retracted position.

2. In a device of the class described, the combination of a tube, a shaft disposed longitudinally of the tube and coaxial therewith, a gaff hook disposed upon one end of the shaft, said shaft being slidable longitudinally of the tube, means for normally maintaining the shaft in a retractive position, means for locking the shaft when moved longitudinally of the tube in one direction, a handle disposed upon one end of the tube, and a locking jaw hingedly secured to the shaft for actuating the locking jaw when the shaft is actuated into endwise movement.

3. In a device of the class described, the combination of a tube, a handle disposed at one end of the tube, a staff disposed within the tube and movable longitudinally of the tube, said staff having a gaff hook disposed upon its end, a locking jaw hingedly disposed relative to the staff and disposed at one end of the tube, means for maintaining the locking jaw inoperative, locking teeth carried by the jaw, and means for releasing the jaw and for moving the same into locking relationship with the point of the gaff hook.

WILLIAM R. KEEHN.
JOHN A. DOERFER.